United States Patent [19]
Brown

[11] 3,720,871
[45] March 13, 1973

[54] DIGITAL FUNDAMENTAL PRP ANALYZER FOR PULSE TRAIN SIGNALS

[76] Inventor: Bruce J. Brown, 4801 Kenmore Avenue, Apt. 1022, Alexandria, Va. 22304

[22] Filed: Dec. 14, 1971

[21] Appl. No.: 207,757

[52] U.S. Cl. ............324/78 D, 235/150.3, 324/77 R, 328/165
[51] Int. Cl. ......G06f 15/20, G01r 23/02, H03b 1/04
[58] Field of Search........324/78 D, 78 F, 77 B, 77 C, 324/77 D; 235/150.3, 152; 343/5 DD; 328/165

[56] References Cited

UNITED STATES PATENTS 3,167,738  1/1965  Westerfield ........................343/5 DP
3,560,852  2/1971  Haskin et al. ........................324/77 B
3,646,330  2/1972  Rudnick et al. ....................324/78 D

*Primary Examiner*—Alfred E. Smith
*Attorney*—R. S. Sciascia et al.

[57] ABSTRACT

A pulse-repetition-period and analyzer comprising binary converter means for converting an input waveform into a series of equal-amplitude binary pulses, shift register means for sorting the pulses into a series of pulse trains ordered according to their pulse repetition periods, shift register means for rejecting from each pulse train any pulses constituting a harmonic rather than a fundamental signal at the input weighted integrator means for individually integrating said fundamental pulse trains and, scanning means for sampling the integrator means outputs in time sequence.

7 Claims, 6 Drawing Figures

DIGITAL FUNDAMENTAL PRP ANALYZER FOR PULSE TRAIN SIGNALS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a pulse-repetition-period (PRP) analyzer.

There is a need in the radar detection field for identifying the source of incoming pulses. The identification is dependent on proper determination of the PRP of the incoming pulses and becomes quite difficult when more than one source of incoming pulses is present. The information which might be desired for a given communication channel is: (a) whether or not a periodic signal is present; (b) the number of periodic signals in the channel; (c) the relative amount of time that these signals are present; and (d) the PRP of each of these signals.

Three basic systems have previously been used to perform such operations: (a) and (b) Swept frequency and bandpass analyzers - The major drawback of these devices is that they display all signal harmonics in addition to the fundamental frequency. In cases of a channel with multiple signals, this results in serious problems, especially if the signals are harmonically related. The harmonics produced by one signal could mask the presence of a fundamental of another signal and prevent its detection. (c) Time Correlator — This device produces the correlation function of the input signal. But it also displays all sub-harmonics of the input signal and therefore has problems similar to those of the swept frequency and bandpass analyzers.

BRIEF SUMMARY OF THE INVENTION

The present invention comprises means which utilizes the techniques of time correlation, pulse suppression and weighted integration to provide a PRP analyzer which displays only the fundamental of each signal present in the communication channel. The input signal is sorted into a series of pulse trains according to their repetition periods, harmonics of each fundamental pulse frequency are then rejected and the outputs are sampled in time sequence after being weighted and integrated.

OBJECTS OF THE INVENTION

An object of this invention is to provide for analysis of input pulse trains so that they may be separated according to the individual repetitive pulse trains existing therein.

Another object is to provide a PRP analyzer capable of providing an output pulse indicating each fundamental PRP existing in a pulse train signal.

Other objects, advantages and novel features of the invention will become apparent from the following detailed description of the invention when considered in conjunction with the accompanying drawings wherein:

THE DRAWINGS

DETAILED DESCRIPTION

Figure 1:
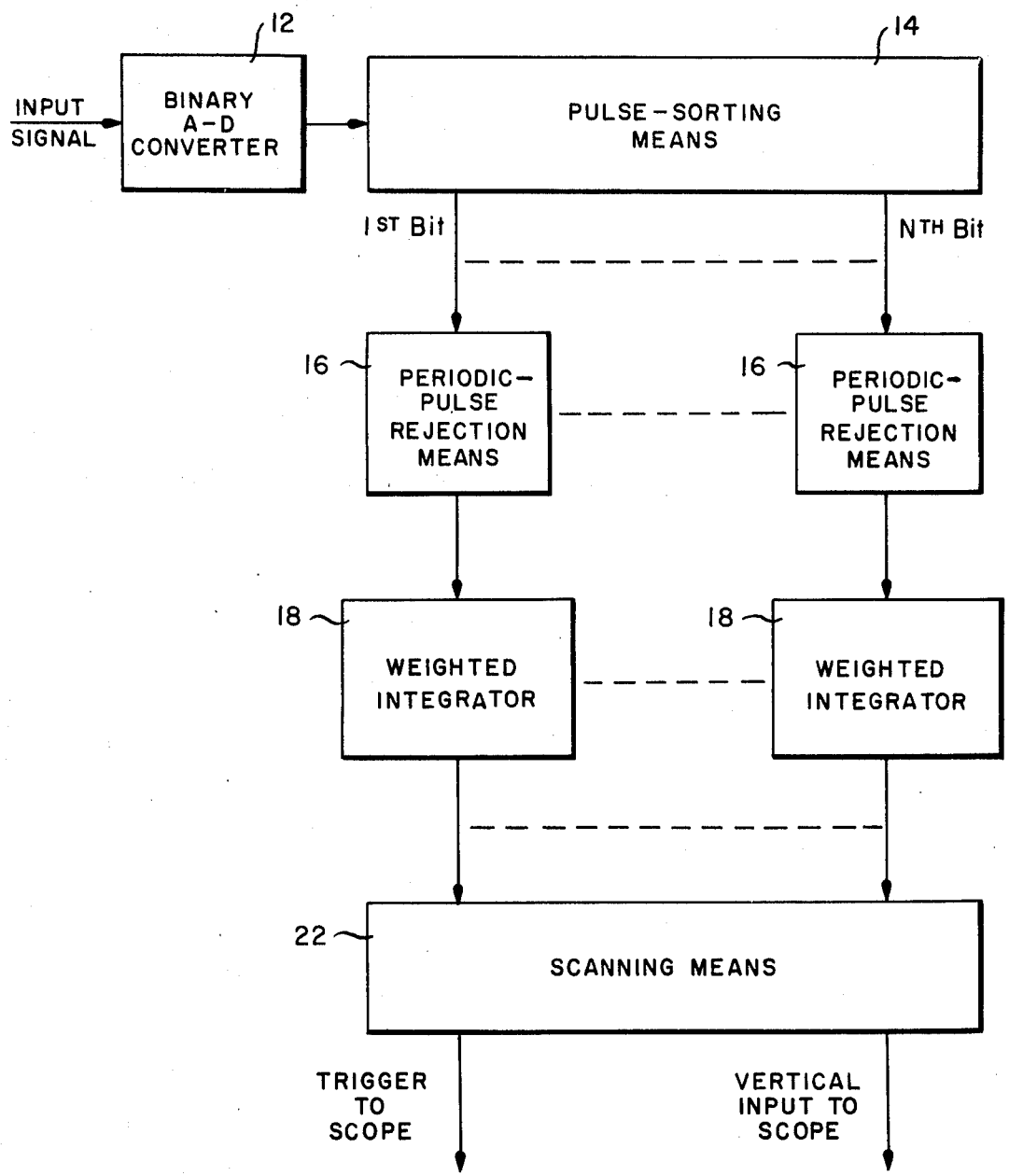
FIG. 1 is a block diagram of an embodiment of the invention.

The block diagram for the invention is shown in FIG. 1. Here the input signals are fed to a binary converter 12 for providing binary signals of identical amplitude from a pulsed signal input. The output from the converter 12 consists of pulses at the repetition rates, or PRP's (pulse repetition periods), of the input signals.

These pulses are fed to the pulse-sorting means 14 which sorts the pulses according to all PRP's present in the input pulse train. However, it should be noted that if the input pulse train has a PRP of 0.1 second, for example, than PRP's of 0.1, 0.2, 0.3, 0.4 seconds, etc., are present. Therefore, the output of the pulse sorter is ambiguous for this situation. Means for rejecting all periodic pulse indications of more than a 0.1 second period is therefore required. This is provided by the periodic-pulse rejection, or harmonic-rejection means 16. There are a plurality of these rejection means in parallel channels, all fed from the pulse-sorting means 14. Each channel rejects all periodic pulses having a different period than that which it is designed to accept. The output of each rejection means is a pulse train which is fed to a weighted integrator 18 which integrates the pulses. The weights are designed to provide equal output amplitudes irrespective of the time period between the input pulses to each integrator.

The outputs of the weighted integrators are fed to a scanning means 22 which scans, or samples, the outputs of the weighted integrators in order and transfers the outputs to a display means, preferably an oscilloscope. The scanning is synchronized with the oscilloscope sweep which is started by the first scanning pulse. All integrator outputs are thus shown on the same sweep baseline, which is calibrated in time so that the fundamental period associated with the particular pulse or pulses shown on the scope can be determined.

FIGS. 2 through 5 show particular implementations for the circuits shown in block form in FIG. 1. The binary converter may be a Schmitt trigger circuit and is not shown since it is shown in many electronic texts. It provides a fixed-amplitude output pulse whenever its input rises above a fixed reference level.

Figure 2:
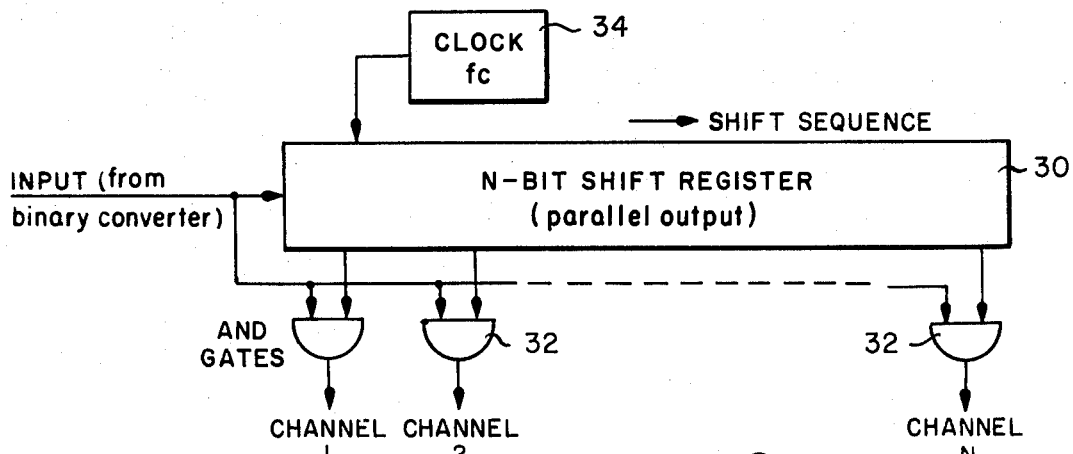
FIG. 2 is an illustration, partially in block form, of a circuit which can be used as a pulse-sorting means.

The pulse-sorting means 14 is shown in FIG. 2. It may comprise an N-bit shift register 30, a clock 34 with a clock frequency of $F_c$ and a plurality of AND gates 32, one for each bit, or N in number, connected in parallel channels to the shift register 30. The input, i.e., the binary converter output signal, is connected to the shift register 30, and also to all AND gates 32, thus appearing simultaneously at the inputs of all the gates.

The input pulse appears at the output of the channel 1 bit of the shift register (actually at the output of the channel 1 AND gate) if its PRP is between 0 and $1/f_c$ seconds, at the channel 2 bit if its PRP is between $1/f_c$ and $2/f_c$, and so on, appearing at the N bit if its PRP is between $N-1/f_c$ and $N/f_c$. Thus assuming $f_c = 10$ Hz + N = 10 bits, it will take 1 second for an input pulse to pass to the 10th bit, the clock repetition rate being 0.1 second. If a repetitive input train with a period of 0.3 seconds is present, a pulse will appear simultaneously on both inputs to the channel 3 AND gate and therefore at its output. However, suppose the input train has a PRP of 0.1 secs, the same as the clock frequency. An output pulse will appear at the output terminal of every gate and it will not be known which output pulse represents the true period; the pulse sorting means provides outputs consisting of a fundamental and some of its harmonics. Therefore, a means for rejecting pulses which do not correspond to the true period of the input pulse train is required.

Figure 3:
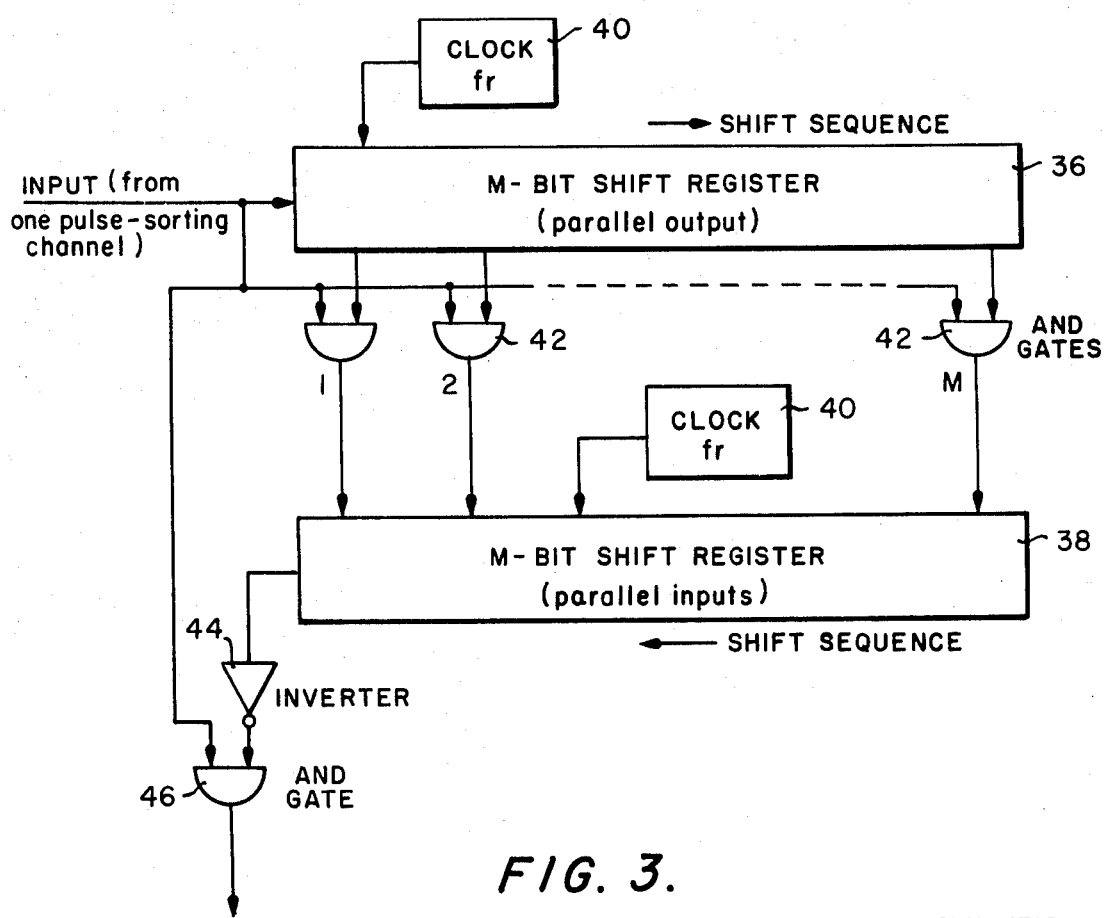
FIG. 3 is an illustration, partially in block form, of a circuit which can be used as a harmonics rejection means.

This means is the periodic-pulse rejection means, or harmonic-rejection means 16 for which a particular circuit is shown in FIG. 3. There are a plurality (N) of these circuits, one for each channel. The input from any AND gate channel, e.g., channel N, is fed simultaneously to an M-bit shift register 36, to a group of parallel-channel AND gates 42 each of which is connected to receive the output of a different bit of the shift register 36, and to a pulse-sorter-output AND gate 46. The output of each AND gate 42 is fed to a different bit of another M-bit shift register 38 in order. Both M-bit shift registers 36 and 38 are clocked by clock 40 at some frequency, $f_r$, but in reverse shift sequences. The design constraints for each channel are indicated by the following relation:

$$N_c/2f_c < M/f_r < N_c/f_c$$

Thus, if we have $f_c = 10$ Hz and we are considering the 10th channel, that is, $N_c = 10$, $M/f_r$ should be between ½ and 1 second, for example, ¾ seconds. For the first channel, $N_c = 1$, and $M/f_r$ would be between one-twentieth and one-tenth seconds.

Consider now as an example, the tenth channel an input signal with a fundamental of 1 second and shift registers 36 and 38 of M = 10 bits. Since $M/f_r$ = ¾ second for the tenth channel, i.e., it will take three-fourths second for a pulse to pass through shift register 36, there will not be a 1-second PRP pulse at the Mth AND gate 42 at the same time the second pulse in this train is at the other input to the AND gate. Thus there will be no output from the other shift register 38 resulting in an output from the inverter 44 to one input of the AND gate 46. Thus, each time a 1-second PRP pulse appears at the other input to the AND gate 46, it will be passed through and the output of this AND gate 46 will have a 1-second pulse train.

But if a harmonic of a 1-second PRP fundamental is present at the input from the same pulse-sorting channel, e.g., the second harmonic with a PRP of one-half second, the first pulse will pass through a bit in the first shift register 36 after a ½-second delay, will pass through one of the shift-register AND gates 42 into the second shift register 38, will pass out of the second shift register 38 one second after it starts into the first shift register 36 providing an output to the inverter 44 to the output AND gate 46 so that the pulse of the harmonic pulse train occurring at the 1-second mark will not be passed through. In this way, this second harmonic pulse train is rejected, as are all other harmonic waves.

Figure 4:
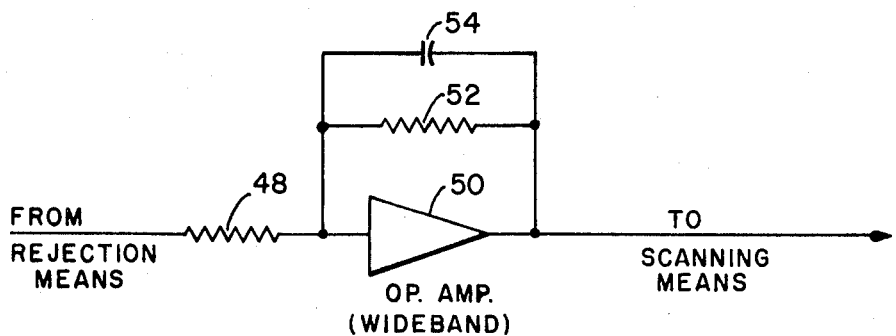
FIG. 4 is a schematic diagram of a weighted integrator circuit which can be used with the invention.

One type of weighted integrator 18 is shown in FIG. 4. This is a standard integrator circuit having an input resistor 48 connected to the input of a wideband operational amplifier 50, and having a resistor 52 and a paralleled capacitor 54 connected across the amplifier 50. The time constant of each integrator is weighted in inverse relation to the ratio $N/2N_c$. Thus, for the exemplary values taken herein, for the first channel the weight would be 10/2(1) = 5 and for tenth channel the weight would be 10/2(10) = 0.5. Thus, the time constant of the first channel should be 10 times shorter than that of the tenth channel. This weighting of the time constant compensates for the longer time between pulses in the tenth channel. In other words, the time of integration should be proportional to the length of the period of the pulse train.

Figure 5:
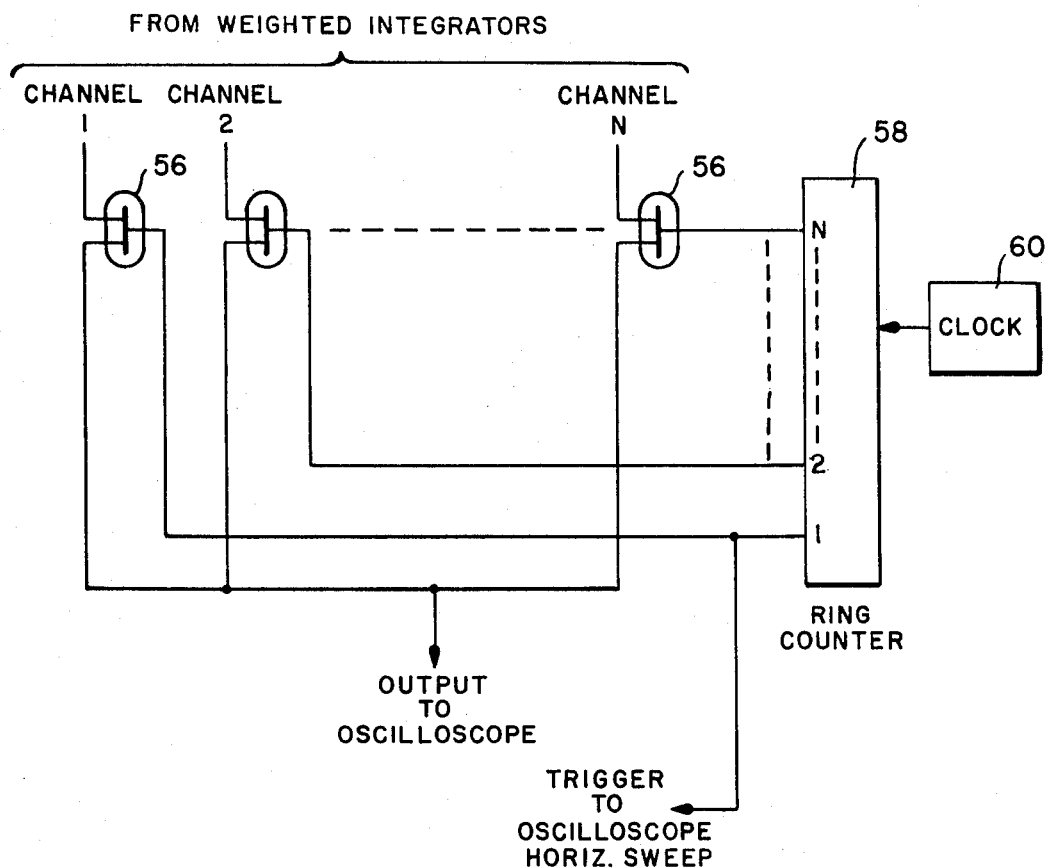
FIG. 5 is an illustration, partially in block form, of a circuit which can be used as a scanning means.

A particular circuit which may be used for the scanning means 22 is shown in FIG. 5. The output of each weighted integrator 18 is connected to the source electrode of a field effect transistor (FET) gate 56. The FET gate is normally non-conductive. The outputs of the gates are taken from the drain electrode and coupled in common to the vertical plates of an oscilloscope for display. The gates 56 are made conductive serially by pulses from a clocked ring counter 58, the output of bit 1 of the counter 58 being connected to the gate electrode of he channel 1 FET gate, the output of bit 2 to the channel 2 gate, and so on. Thus, each channel is sampled in turn.

The output of pulse of the first bit of the counter 58 is also used to trigger the horizontal sweep of the oscilloscope which lasts through the complete scan period of the counter 58. For the 1-second period of the N-bit shift register 30, the complete scan period might be 10 seconds and the ring-counter clock 60 might have a period of 1 second, for example.

The accuracy of the display is dependent on the clock frequency and the number of bits in the shift registers so that accuracy can be improved by adding additional bits and by increasing clock frequency.

Figure 6:
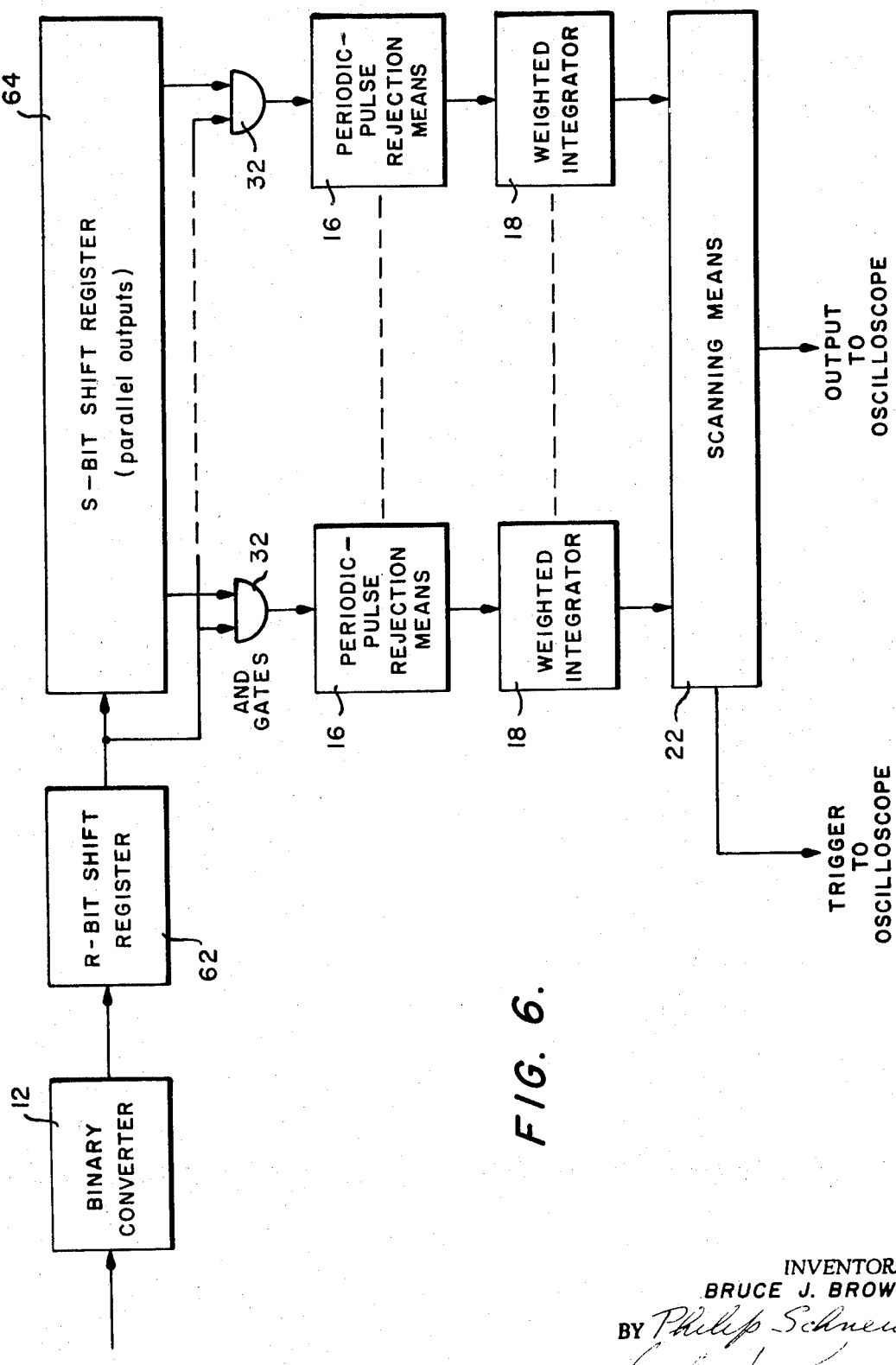
FIG. 6 is a block diagram of another form of the invention.

It is possible to improve the accuracy of the system considerably by looking at a narrow part of the PRP spectrum rather than the complete band. The embodiment of the invention shown in FIG. 6 accomplishes this function. Here, a serial shift register, the R-bit shift register 62, has been added in series so that the pulse-sorting means now comprises the R-bit shift register 62, the S-bit shift register 64, and the parallel-channel AND gates 32. In this embodiment, $R + S = N$. Thus, if N in the previous embodiment had been 100 bits and the clock frequency, $f_c$, had been set to clock the register at 1 us intervals, if it is desired to look at only 25 pulse periods, for example, the periods from 75–100 us, the R-bit shift register 62 would have 75 bits, the S-bit shift register 64 would have 25 bits and the 25 periodic pulse rejection means 16 would be designed for $N_c$'s ranging from 75 to 100. The range per sorter channel is from $R/f_c + (S_c - 1)/f_c$ to $R/f_c + S_c/f_c$ where $S_c$ is a specific bit in the S-bit shift register 64. The total output display range is $S/f_c$ seconds, or in the example given, $25/10^6 = 25$ μs.

This embodiment results, in the example given, in an equipment savings of 75 channels at the expense of adding one R-bit shift register, as well as improving the accuracy.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A pulse-repetition-period (PRP) analyzer comprising, in combination:
    means for converting an input waveform into a series of equal binary pulses, each occurring whenever said input waveform exceeds a predetermined level;
    means connected to said binary converter means for sorting the pulses therefrom into a series of pulse trains ordered according to their pulse repetition periods;
    means connected to said pulse-sorting means for rejecting from each pulse train any pulses constituting a harmonic rather than a fundamental wave in the input to said binary converter;
    means connected to said harmonic-rejection means for individually integrating said fundamental pulse trains, the integrating periods being weighted in proportion to the relative lengths of the periods of said pulse trains; and
    scanning means connected to said weighted integration means for sampling the outputs therefrom in time sequence, thereby referencing each output in time according to its period.

2. A PRP analyzer as set forth in claim 1, including means for visually displaying the output of said scanning means.

3. A PRP analyzer as set forth in claim 1, wherein said pulse-sorting means comprises a shift register having N bits with N parallel outputs and a set of N AND gates, each connected to a different one of said parallel outputs, and each connected also to the input of said shift register, each AND gate comprising a separate channel.

4. A PRP analyzer as set forth in claim 1, wherein said pulse-sorting means comprises an R-bit, serial, shift register, an S-bit parallel-output shift register, and a set of S AND gates, said R-bit register being connected between said binary converter and said S-bit register, the output of each bit of the latter being connected to a different one of said AND gates, the input to said S-bit register also being connected in common to all said AND gates, the total time-analysis range of the analyzer then being equal to $(R + S)$ times the resting time between the shifting of the bits and the PRP analysis being done only on the last S bits.

5. A PRP analyzer as set forth in claim 3, wherein said harmonic-rejection means comprises a plurality of means, each connected to receive the output of a different one of said channels and each comprising an M-bit, parallel-output shift register, an M-bit, parallel-input, shift register, a set of M AND gates, an inverter and an output AND gate, the input from one channel of said pulse-sorting means being fed to said parallel-output register, each of said set of AND gates being connected to the output of a different bit of said parallel-output register and the input to said parallel-output register being connected to all said AND gates in common, the output of each AND gate being connected to a different bit in said parallel-input register in reversed order so that the output of the first gate goes to the last bit and the output of the last gate goes to the first bit, the output of the parallel-input register being fed to said inverter, and the output of said inverter and the input to said parallel-output register being fed as inputs to said output AND gate.

6. A PRP analyzer as set forth in claim 5, wherein said weighted integration means comprises a set of N weighted integrators, each connected to a different one of said harmonic-rejection-means output AND gates, the relative weights being calculated so that the integration period of each integrator in the set is proportional to the length of the period of its input pulse train, whereby the resulting output of each integrator is substantially equal in amplitude.

7. A PRP analyzer as set forth in claim 6, wherein said scanning means comprises ring-counting means and a set of N gates, one input to each gate being taken from a different one of said weighted integrators, a second input to each gate being taken from said counting means in order, so that said gates are made serially conductive, the outputs of said gates being fed to a utilization means for indicating the period of the output from each gate.

* * * * *